(12) United States Patent
Hung

(10) Patent No.: US 7,093,516 B2
(45) Date of Patent: Aug. 22, 2006

(54) SIMPLE, COMPACT AND EFFECTIVE SELF-EXTENDING AND RETRACTING BICYCLE CRANK ARM

(76) Inventor: Eric Kam-Ling Hung, 49 Dressler Drive, Ottawa (CA) K2L 3A6

( * ) Notice: Subject to any disclaimer, the term of this patent is extended or adjusted under 35 U.S.C. 154(b) by 101 days.

(21) Appl. No.: 10/604,358

(22) Filed: Jul. 14, 2003

(65) Prior Publication Data
US 2004/0103747 A1    Jun. 3, 2004

(51) Int. Cl.
*G05G 1/16* (2006.01)
(52) U.S. Cl. .................................................. 74/594.3
(58) Field of Classification Search ............... 74/594.7, 74/594.4, 594.3, 594.1; 280/294, 295; 482/57; D12/125
See application file for complete search history.

(56) References Cited

U.S. PATENT DOCUMENTS

| | | | | |
|---|---|---|---|---|
| 516,137 A * | 3/1894 | Tyler | | 74/594.3 |
| 538,242 A * | 4/1895 | Devers | | 74/594.3 |
| 550,206 A * | 11/1895 | Tompkins | | 74/594.3 |
| 571,753 A * | 11/1896 | Decker | | 74/594.3 |
| 1,714,134 A * | 5/1929 | Poyser | | 74/594.3 |
| 4,446,754 A | 5/1984 | Chattin | | 74/594.3 |
| 4,519,271 A | 5/1985 | Chattin | | 74/594.3 |
| 4,673,178 A * | 6/1987 | Dwight | | 482/57 |
| 4,706,516 A | 11/1987 | Xi | | 74/594.1 |
| 4,807,491 A | 2/1989 | Stuckenbrok | | 74/594.1 |
| 4,882,945 A | 11/1989 | Trevizo | | 74/594.3 |
| 4,960,013 A | 10/1990 | Sander | | 74/594.3 |
| 5,095,772 A | 3/1992 | Fortson | | 74/594.3 |
| 5,207,119 A | 5/1993 | Garneau | | 74/594.3 |
| 5,261,294 A | 11/1993 | Ticer et al. | | 74/594.1 |
| 5,553,515 A | 9/1996 | Yan et al. | | 74/594.3 |
| 5,566,590 A | 10/1996 | Wan | | 74/594.3 |
| 5,879,017 A | 3/1999 | Debruin | | 280/259 |
| 6,152,471 A | 11/2000 | Kang et al. | | 280/261 |
| 6,199,449 B1 | 3/2001 | Harrington | | 74/594.1 |
| 6,276,234 B1 | 8/2001 | Harrington | | 74/594.3 |
| 6,474,193 B1 | 11/2002 | Farney | | 74/594.3 |
| 6,487,933 B1 * | 12/2002 | Orioli et al. | | 74/594.3 |
| 6,508,146 B1 | 1/2003 | Kang et al. | | 74/594.3 |
| 6,640,662 B1 * | 11/2003 | Baxter | | 74/594.3 |
| 6,802,798 B1 * | 10/2004 | Zeng | | 482/57 |
| 6,820,517 B1 * | 11/2004 | Farney | | 74/594.3 |
| 2005/0263978 A1 * | 12/2005 | Ascher | | 280/261 |

\* cited by examiner

*Primary Examiner*—Sherry Estremsky
(74) *Attorney, Agent, or Firm*—Nelligan OBrien Payne LLP; Wing T. Yan

(57) ABSTRACT

This invention is a bicycle crank and pedal assembly with a self-extending and retracting crank arm. The assembly only has three one-piece components that move relative to each other, if the bearings used in friction reduction are ignored. It is simple in design, compact in size and very effective in delivering the benefits of a self-extending and retracting crank arm. In particular, the assembly has (a) the maximum arm length for over 90 degrees of arm directions in the power down stroke and (b) the minimum arm length for close to 90 degrees of arm directions in the return up stroke.

9 Claims, 4 Drawing Sheets

SIMPLE, COMPACT AND EFFECTIVE SELF-EXTENDING AND RETRACTING BICYCLE CRANK ARM

FIELD OF THE INVENTION

This invention relates to a bicycle crank and pedal assembly with a self-extending and retracting crank arm.

BACKGROUND OF THE INVENTION

This invention relates to a bicycle crank and pedal assembly and, more particularly, to an assembly with a self-extending and retracting crank arm.

The length of the crank arm in a bicycle is a compromise between performance and comfort. A longer arm allows a cyclist to travel at the same speed with a lower pedal effort or a slower pedal turning rate, or both. However, the longer arm increases the size of the pedal track round the crank axle and causes discomfort to the leg. One method to get the benefit of a longer arm without getting the discomfort is to extend the arm beyond the compromised length during the pedal power down stroke and retract it below this length in the return upstroke.

Using a longer crank arm is not equivalent to using a lower gear ratio in cycling. A lower gear ratio allows the cyclist to travel with a lower pedal effort. However, it also requires the cyclist to turn the pedal at a higher rate in order to travel at the same speed.

Crank and pedal assemblies with self-extending and retracting crank arms have been described by Chattin (U.S. Pat. Nos. 4,446,754, 4,519,271), Xi (U.S. Pat. No. 4,706,516), Stuckenbrok (U.S. Pat. No. 4,807,491), Trevizo (U.S. Pat. No. 4,882,945), Sander (U.S. Pat. No. 4,960,013), Fortson (U.S. Pat. No. 5,095,772), Garneau (U.S. Pat. No. 5,207,119), Ticer and Farney (U.S. Pat. No. 5,261,294), Yan and Kim (U.S. Pat. No. 5,553,515), Wan (U.S. Pat. No. 5,566,590), Debruin (U.S. Pat. No. 5,879,017), Kang, Kim and Park (U.S. Pat. Nos. 6,152,471, 6,508,146), Harrington (U.S. Pat. Nos. 6,199,449, 6,276,234) and Farney (U.S. Pat. No. 6,474,193). These assemblies have many notable deficiencies. Firstly, they are ineffective in delivering the benefits of a self-extending and retracting crank arm, because they only have one arm direction, or one arm position with a fully extended arm. For all other directions, the arm is either extending or retracting. Secondly, compared with the standard assembly in a bicycle, many are bulky and have noticeably reduced clearances between the crank arm and the leg. Thirdly, many also have more than twice the number of components moving relative to each other, components moving too close to the leg, components that could wear out prematurely, or high frictional loss.

SUMMARY OF THE INVENTION

This invention is a bicycle crank and pedal assembly with a self-extending and retracting crank arm. The assembly only has the following three one-piece components that move relative to each other, if the bearings used in friction reduction are ignored:

1. A crank arm that has a cavity for a plate, a track for a bar to move back and forth along the length of the arm, and slits cut along imaginary lines from the crank axis to the pedal end of the crank arm;

2. A bar that moves on a track in the crank arm and has a pedal spindle fixed to it at one end; and 3. A subassembly in which a plate and a pedal are fixed to the opposite ends of a plate shaft.

The slits in the crank arm are elongated hole. Both pedal spindle and plate shaft are inserted into the arm through a slit, so that both intersect the imaginary lines from the crank axis to the pedal end for all crank directions. The pedal spindle and the plate shaft are coaxial. One of them is partially inside a cylindrical hole along the axis of the other.

The crank axis is fixed. The axes of the pedal spindle and the plate shaft are movable, co-located, and parallel to the crank axis. During cycling, the pedal rotates the plate inside the plate cavity in the crank arm and the perimeter surface of the cavity operatively cooperates with the plate to change the distance between the axes of the crank and the pedal spindle in a prescribed manner. This distance is the effective length of the crank arm.

In the crank arm extension phase that begins with the arm at the 12 o'clock arm direction, the plate or the foot works with centrifugal force to increase the effective length of the crank arm by moving the pedal spindle and the plate shaft away from the crank axle. After the extension, foot motion and gravity maintain the length at the maximum value. In the retraction phase that begins with the crank arm at the 6 o'clock arm direction, the plate, foot and crank arm rotation combine to reduce the effective arm length by moving the pedal spindle and the plate shaft closer to the crank axle. After retraction, the foot and gravity maintain the length at the minimum value until the crank arm returns to the 12 o'clock direction.

This invention differs from those in the references cited in that the crank and pedal assembly is simple in design, compact in size and very effective in delivering the benefits of a self-extending and retracting crank arm. In particular, it delivers (a) the maximum effective arm length for over 90 degrees of arm directions in the power down stroke and (b) the minimum effective arm length for close to 90 degrees of arm directions in the return upstroke.

DETAILED DESCRIPTION OF THE INVENTION

The crank and pedal assembly on the right hand side of a bicycle is described in detail here. A description of the assembly on the other side is unnecessary, because this assembly is a mirror image of the one on the right.

Three embodiments are presented. The last embodiment is included for the sake of completeness only.

First Embodiment

The crank and pedal assembly has a self-extending and retracting crank arm. It comprises (i) a crank arm that has a cavity for a rotating plate, a track for a bar to move back and forth along the length of the arm, and slits along imaginary lines from the crank axis to the pedal end of the crank arm; (ii) a bar that moves on a track in the crank arm and has a pedal spindle fixed to it at one end; and (iii) a subassembly in which a plate and a pedal are fixed to the opposite ends of a plate shaft. The pedal spindle and the plate shaft pass through the slits in the crank arm to reach the bar and the plate, respectively. They have co-located axes and the plate shaft is partially inside a cylindrical hole along the axis of the pedal spindle. Their movements are restricted by the slits to movements closer to or farther away from the crank axis. During cycling, the pedal rotates the plate inside the plate cavity and the perimeter surface of the cavity operatively cooperates with the plate to change the distance between the axes of the crank and the pedal spindle.

Figure 1:
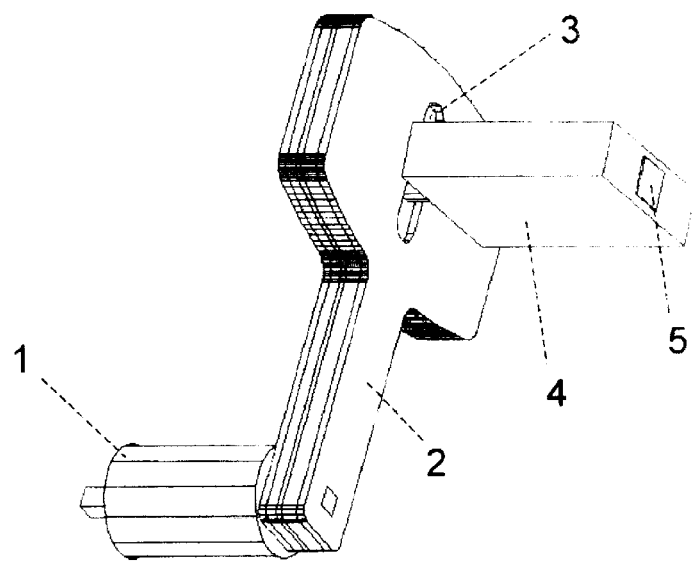
FIG. 1 is a view of the crank and pedal assembly with the crank arm at the one o'clock arm direction. The lines on the side of the crank arm indicate the locations where the arm would be cut to produce an exploded view of the assembly.

Referring to the drawings, FIG. 1 shows a view of the assembly with the crank arm at the one o'clock direction. The visible components are the crank axle 1, crank arm 2, pedal 4, plate shaft 5, and a slit 3 in the crank arm 2. The end of the plate shaft is drawn with a square cross section to indicate that the pedal does not rotate about the shaft. The lines on the side of the crank arm show the locations where the arm would be cut to produce an exploded view of the assembly.

Figure 2:
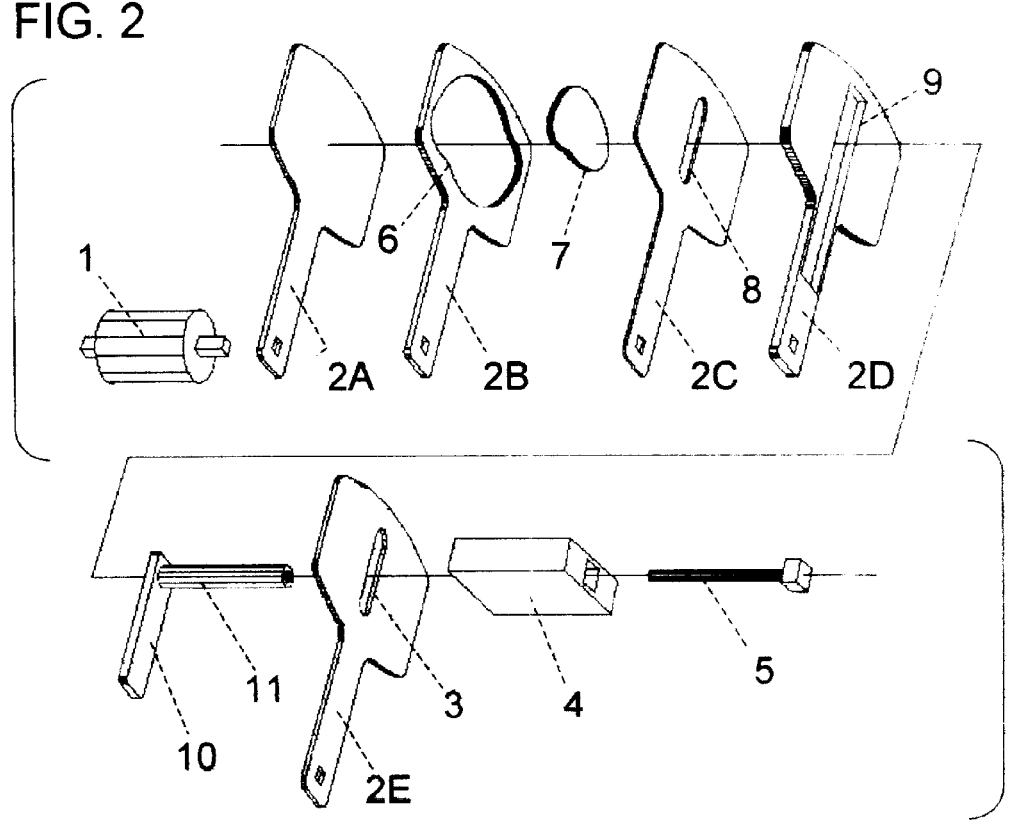
FIG. 2 is an exploded view of the assembly shown in FIG. 1. The crank arm has been cut into five slices labeled as slices 2A–2E.

FIG. 2 shows an exploded view of the assembly shown in FIG. 1. The crank arm has been cut into five vertical slices denoted by slices 2A–2E. Slice 2A is the back of the crank arm. Slice 2B has a cavity 6 for holding the plate 7. To avoid confusion, the line to the cavity has been terminated at the perimeter of the cavity. Slice 2D has a track 9 for the movable bar 10, and the bar 10 has a pedal spindle 11 fixed to it at one end. The pedal spindle 11 has a cylindrical hole along its length for the plate shaft 5 to pass through. Slices 2C and 2E combine to keep the bar in the track 9 and to resist the tilting force the pedal 4 applies to the plate 7 and the bar 10 in the power down stroke. They have slits 8 and 3, respectively, for the plate shaft 5 and the pedal spindle 11 to pass through. The main body of the plate shaft 5 is a circular rod. One end of the shaft 5 is fixed to the pedal 4. The other end is inserted into the hole in the pedal spindle 11 and then fixed to the plate 7. The pedal end of the plate shaft 5 has been drawn as a rectangular block, to indicate that the pedal 4 does not rotate about the shaft 5.

The shapes of cavity 6 and plate 7 are determined by (i) a user-specified pedal track round the crank axle, and (ii) a set of user-specified pedal tilt angles for all crank directions. During cycling, the perimeter surface of the cavity operatively cooperates with the plate to reproduce the user-specified pedal track.

Figure 3A:
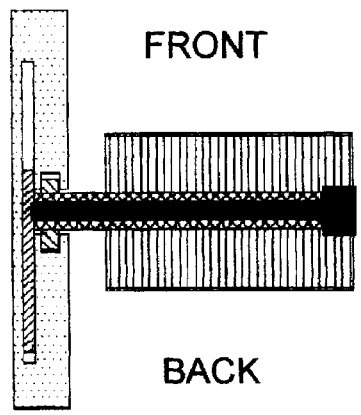
FIG. 3A shows a sectional view of the assembly in the horizontal plane through the plate shaft in FIG. 1.
Figure 3B:
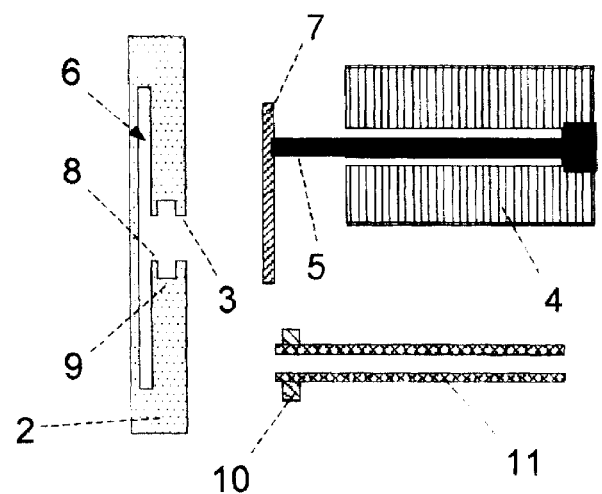
FIG. 3B shows the three one-piece components of the crank and pedal assembly in FIG. 3A.

FIG. 3A shows a sectional view of the assembly in the horizontal plane through the plate shaft 5 in FIG. 1. The directions of the front and the back of the bicycle are marked. FIG. 3B shows the three one-piece components of the crank and pedal assembly in this view. The first one-piece component is the crank arm 2, which has the plate cavity 6, bar track 9, and arm slits 8 and 3. The second is the bar 10 with the pedal spindle 11 fixed to it at one end. The third is a subassembly in which the plate 7 and the pedal 4 are fixed to the ends of the plate shaft 5. The pedal spindle 11 has a cylindrical hole for the coaxial plate shaft 5.

Figure 4A:
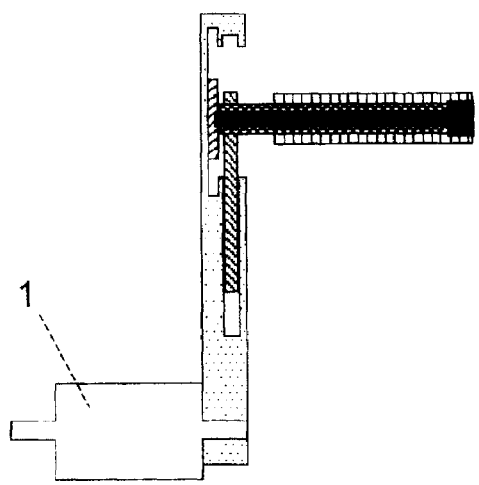
FIG. 4A shows a sectional view of the assembly in the plane through the plate shaft and the crank axle in FIG. 1.
Figure 4B:
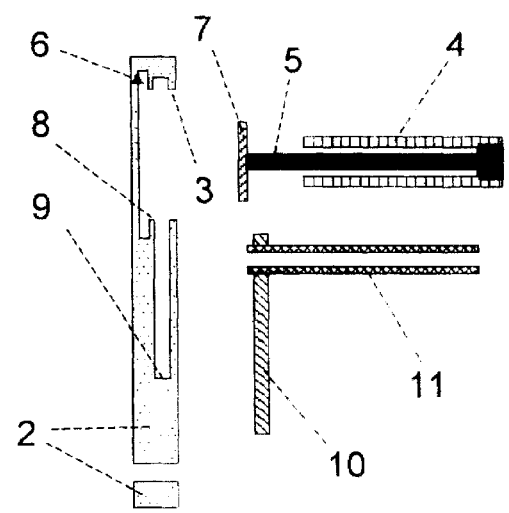
FIG. 4B shows the three one-piece components of the crank and pedal assembly in FIG. 4A.

FIG. 4A shows a sectional view of the assembly in the plane through the crank axle 1 and the plate shaft 5 in FIG. 1. FIG. 4B shows the three one-piece components of the crank and pedal assembly in this view.

Figures 5A, 5B, 5C, 5D:
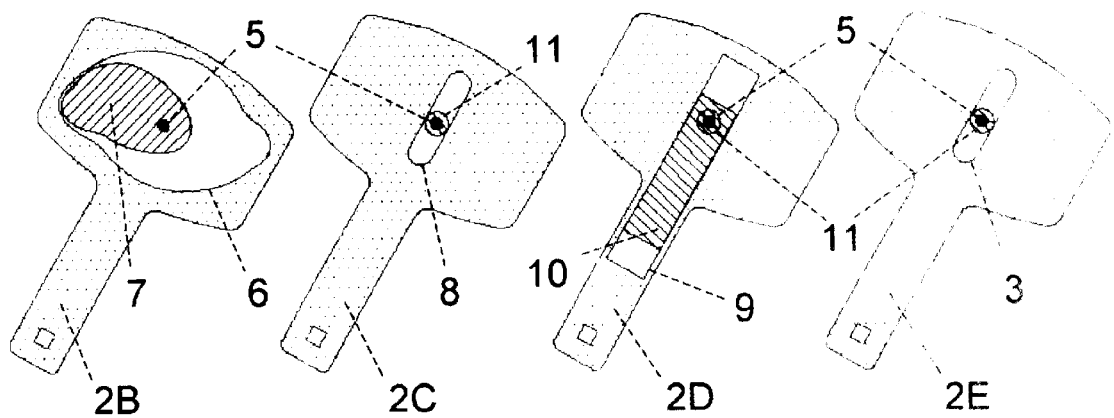
FIGS. 5A–5D show the sectional views of the assembly in four vertical planes through the crank arm and perpendicular to the plate shaft. The planes pass through the centers of slices 2B–2E, respectively, in FIG. 2.

FIGS. 5A–5D show four sectional views of the assembly in planes perpendicular to the plate shaft 5. FIG. 5A is in a plane through slice 2B and the plate 7. It shows the shapes of the plate 7 and the plate cavity 6. The black dot in the plate 7 is the plate shaft 5. FIG. 5B is in a plane through slice 2C. It shows the shape of the slit 8, which is located between the plate 7 and the bar 10. The black dot inside the slit is the plate shaft 5 and the circle centered at the dot is a cross section of the pedal spindle 11. FIG. 5C is in a plane through the bar 10. This bar is pushing forward and downward against the track 9 in slice 2D. FIG. 5D is in a plane through slice 2E. Slit 3 has the same shape as the slit 8 in slice 2C.

Figure 6:
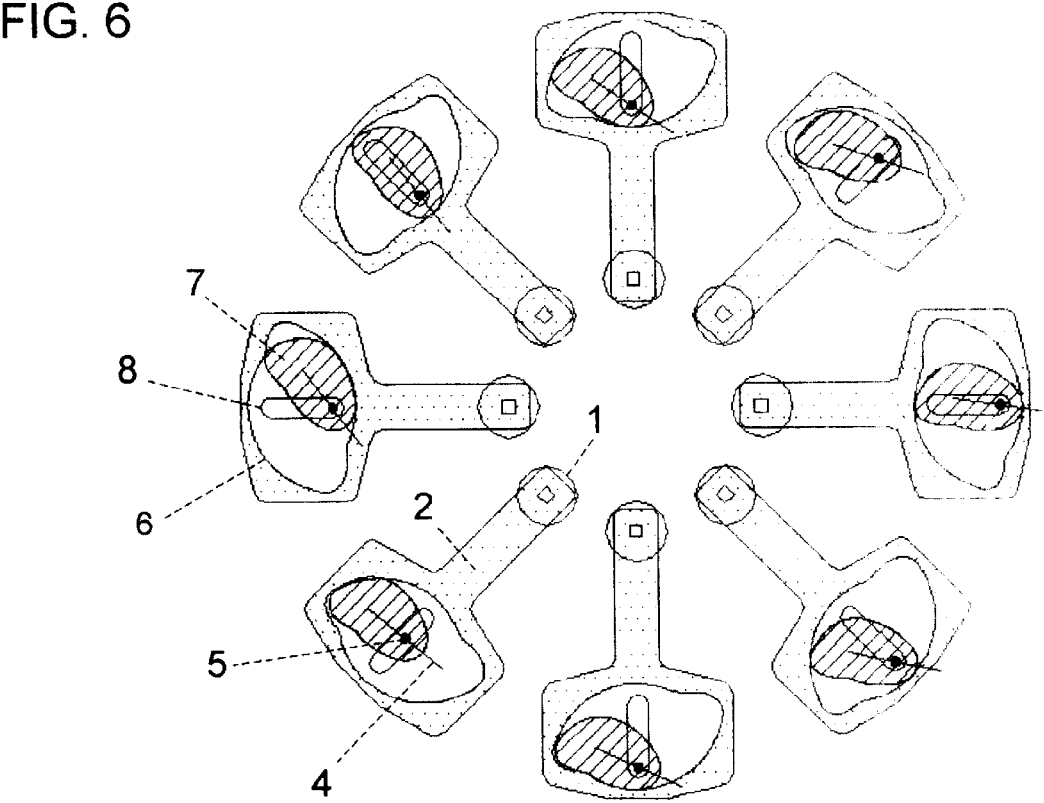
FIG. 6 shows the positions and orientations of the plate, plate cavity, plate shaft and the outline of the slit in slice 2C for eight different crank arm directions.

FIG. 6 shows the positions and orientations of the crank arm 2, pedal 4, plate shaft 5, plate cavity 6, plate 7 and arm slit 8 for eight crank arm directions. The pedal 4 is represented by a line, so that it does not block the objects behind it. The plate 7 tilts with the pedal 4, because the plate 7 and the pedal 4 are fixed to the plate shaft 5. The slit 8 and plate cavity 6 rotate with the crank arm, because they are holes in the crank arm. The cranks arm on the right hand side of a bicycle rotates clockwise during pedaling. This figure shows that the crank arm has (a) the maximum effective length for over 90 degrees of arm directions in the power down stroke and (b) the minimum effective length for close to 90 degrees of arm directions in the return upstroke.

During the crank arm extension phase that begins at the 12 o'clock arm direction, forward foot motion and centrifugal force increase the effective length of the crank arm by pushing the plate shaft 5 away from the crank axle. The plate 7 only prevents the effective arm length from falling below a specified value. At the end of extension phase, foot motion and gravity keep the distance at the maximum value. In the pedal return upstroke that begins at the 6 o'clock arm direction, the plate 7, foot and clockwise rotation of the crank arm 2 combine to push the plate shaft 5 closer to the crank axle 1. After retraction, foot motion and gravity keep the effective arm length at the minimum value until the crank arm returns to the 12 o'clock direction.

It should be noted that the tilt angle of pedal 4 and the distance of the pedal spindle from the crank axle are dependent on the direction of the crank arm 2 and are user-specified parameters.

It should also be noted that the slits in the crank arm restrict the movements of the plate shaft and the pedal spindle to movements closer to or farther away from the crank axis. This axis is perpendicular to the crank arm and is at the center of crank axle 1.

Second Embodiment

Figure 7:
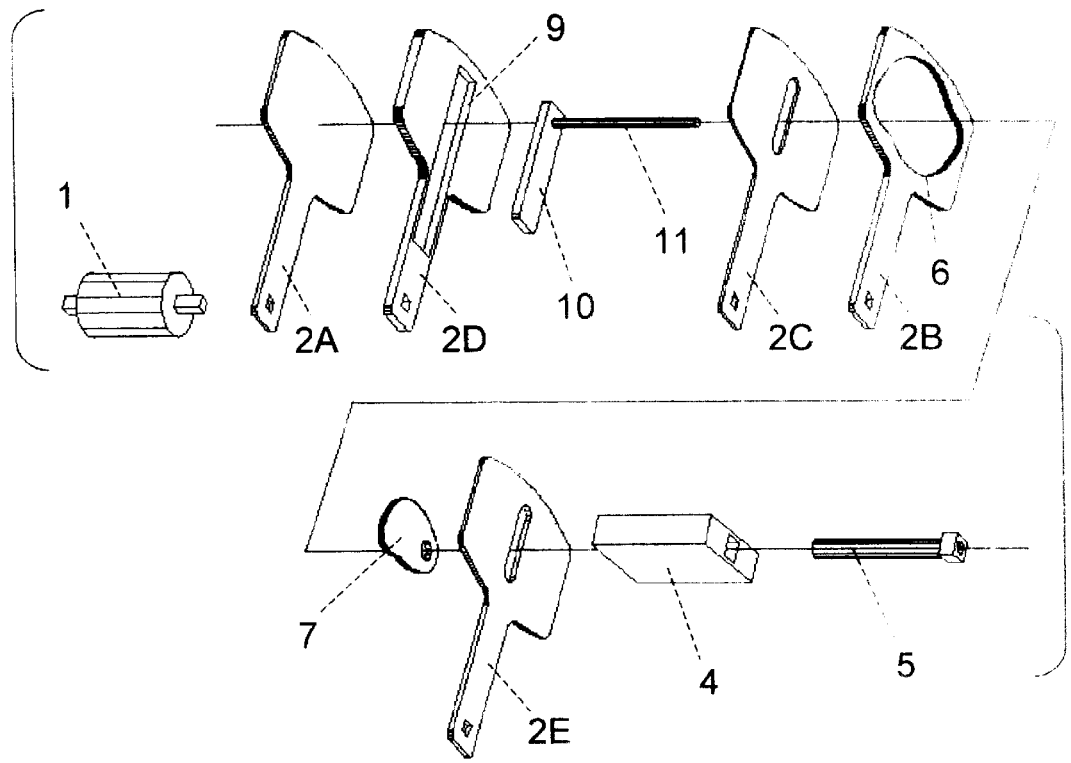
FIG. 7 is an explode view of the crank and pedal assembly in a second embodiment of the invention. The crank arm has also been cut into five slices labeled as slices 2A–2E.
Figure 8A:
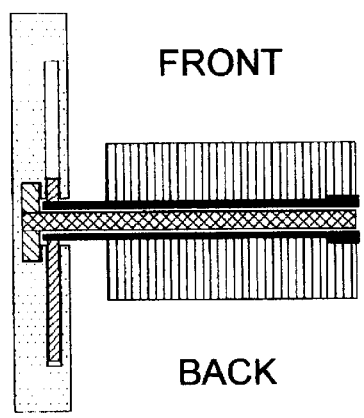
FIG. 8A shows a sectional view of the assembly in the horizontal plane through the plate shaft in the second embodiment.
Figure 8B:
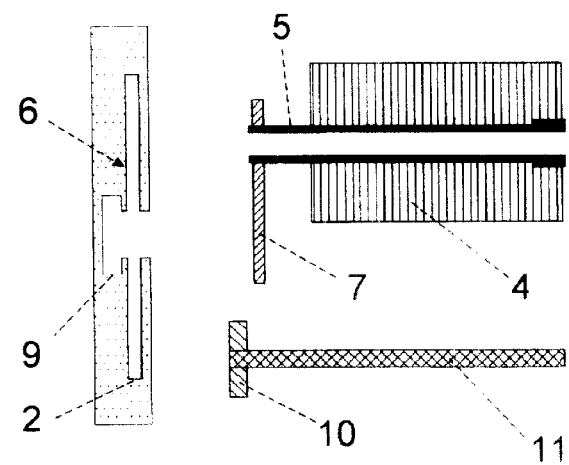
FIG. 8B shows the three one-piece components of the crank and pedal assembly in FIG. 8A.

The second embodiment is obtained from the first by exchanging the positions of the bar 10 and slice 2D with those of the plate 7 and slice 2B, respectively. FIG. 7 shows an exploded view of the new crank and pedal assembly after the exchange. The crank arm is at the one o'clock direction. FIG. 8A shows a sectional view of the new assembly in the horizontal plane through the plate shaft 5 and FIG. 8B shows the three one-piece components of the assembly in FIG. 8A. The pedal spindle 11 in this embodiment is a solid rod and the plate shaft 5 has a cylindrical hole for the spindle 11 to pass through.

Third Embodiment

The third embodiment is obtained from the first by deleting the plate and the plate cavity, i.e., deleting the plate 7 and slice 2B, from the design. Its effective arm lengths in the 12–3 o'clock and 6–12 o'clock arm directions depend on the foot motion of the cyclist.

The invention claimed is:

1. A bicycle crank and pedal assembly with a self-extending and retracting crank arm; said assembly comprising:
   a crank arm with a plate cavity, a bar track, and two slits;
   a bar inside said bar track in said crank arm; said bar being fixed to a pedal spindle at one end; and
   a plate shaft; said plate shaft being fixed to a plate at one end and to a pedal at the other end; said plate being inside said plate cavity in said crank arm.

2. The bicycle crank and pedal assembly of claim 1, wherein said plate shaft is partially inside a cylindrical hole along the axis of said pedal spindle; wherein the axes of said pedal spindle and said plate shaft are co-located; wherein said slits in crank arm restrict movements of said plate shaft and said pedal spindle to movements closer to or farther away from the crank axis.

3. The bicycle crank and pedal assembly of claim 2, wherein the axis of said pedal spindle is spaced apart and parallel to the rotation axis of said crank; wherein the perimeter surface of the said plate cavity operatively cooperates with said plate to change the distance between the axes of said crank and said pedal spindle during cycling.

4. The bicycle crank and pedal assembly of claim 3, wherein the perimeter surface of said cavity operatively cooperates with said plate to increase the distance between the axes of said crank and said pedal spindle from a minimum value to a maximum value in the first half of the power down stroke and keep said distance at said maximum value in the second half of the power down stroke.

5. The bicycle crank and pedal assembly of claim 3, wherein the perimeter surface of said cavity operatively cooperates with said plate to decrease the distance between the axes of said crank and said pedal spindle from said maximum value to said minimum value in the first half of the return upstroke and keep said distance at said minimum value in the second half of the return upstroke.

6. The bicycle crank and pedal assembly of claim 1, wherein the axis of said pedal spindle is spaced apart and parallel to the rotation axis of said crank; wherein the perimeter surface of the said plate cavity operatively cooperates with said plate to change the distance between the axes of said crank and said pedal spindle during cycling.

7. The bicycle crank and pedal assembly of claim 6, wherein the perimeter surface of said cavity operatively cooperates with said plate to increase the distance between the axes of said crank and said pedal spindle from a minimum value to a maximum value in the first half of the power down stroke and keep said distance at said maximum value in the second half of the power down stroke.

8. The bicycle crank and pedal assembly of claim 6, wherein the perimeter surface of said cavity operatively cooperates with said plate to decrease the distance between the axes of said crank and said pedal spindle from said maximum value to said minimum value in the first half of the return upstroke and keep said distance at said minimum value in the second half of the return upstroke.

9. The bicycle crank and pedal assembly of claim 1, wherein said pedal spindle is a solid rod; wherein said plate shaft has a cylindrical hole along the axis; wherein said pedal spindle is partially inside said cylindrical hole; wherein said pedal spindle and said plate shaft have co-located axes.

* * * * *